(12) United States Patent
Boykin et al.

(10) Patent No.: US 9,272,659 B1
(45) Date of Patent: Mar. 1, 2016

(54) AUXILIARY VEHICLE LAMP OPERATION SYSTEM

(71) Applicants: Marcus Boykin, Lexington, TN (US); Andre Lamarr Gist, Lexington, TN (US)

(72) Inventors: Marcus Boykin, Lexington, TN (US); Andre Lamarr Gist, Lexington, TN (US)

(73) Assignee: Marcus C. Boykin, Lexington, TN (US)

( * ) Notice: Subject to any disclaimer, the term of this patent is extended or adjusted under 35 U.S.C. 154(b) by 24 days.

(21) Appl. No.: 14/197,453

(22) Filed: Mar. 5, 2014

Related U.S. Application Data

(63) Continuation-in-part of application No. 13/669,178, filed on Nov. 5, 2012, now abandoned.

(60) Provisional application No. 61/555,987, filed on Nov. 4, 2011.

(51) Int. Cl.
  *B60Q 1/00* (2006.01)
  *B60Q 1/08* (2006.01)

(52) U.S. Cl.
  CPC .............. *B60Q 1/0064* (2013.01); *B60Q 1/085* (2013.01)

(58) Field of Classification Search
  CPC .. B60Q 1/0094; B60Q 1/0023; B60Q 1/0064; H05B 39/105; H05B 39/10
  See application file for complete search history.

(56) References Cited

U.S. PATENT DOCUMENTS

| | | | |
|---|---|---|---|
| 3,558,972 A | | 1/1971 | Arai |
| 3,883,777 A | | 5/1975 | Morita |
| 4,068,216 A | * | 1/1978 | Brouwer et al. ............... 340/641 |
| 4,841,198 A | * | 6/1989 | Wilhelm .......................... 315/82 |
| 5,023,515 A | * | 6/1991 | Olon et al. ....................... 315/88 |
| 5,680,098 A | * | 10/1997 | Bejster et al. .................. 340/458 |
| 7,671,571 B2 | * | 3/2010 | Burlak et al. .................. 323/275 |
| 2005/0152145 A1 | * | 7/2005 | Currie et al. ................... 362/294 |
| 2007/0008665 A1 | * | 1/2007 | Moyer et al. ..................... 361/42 |
| 2007/0229001 A1 | * | 10/2007 | McIntosh et al. .............. 315/307 |
| 2008/0203975 A1 | * | 8/2008 | Burlak et al. .................. 320/161 |

OTHER PUBLICATIONS

Allegro, Product Information A Micro-Packaged Linear Current Sensor IC, Shaum Milano, Apr. 2013.*
International Rectifier, IRL3103, HEXFET Power MOSFET, Mar. 16, 2001.*

* cited by examiner

*Primary Examiner* — Alexander H Taningco
*Assistant Examiner* — Christine Johnson

(57) ABSTRACT

An auxiliary vehicle lamp operation system that detects interruption of DC current flow by a PIC microprocessor, which is Hall Effect device, based upon a decrease in the magnetic flow to a failing dim headlight bulb which, then, activates a power width modulation transistor which, in turn, activates an N channel power MOSFET, through which the microprocessor pulses the output thereof at approximately a 50% duty cycle to the bright headlamp bulb, permitting illumination output of the bright headlamp approximately the same as normal output of the dim headlight bulb. Upon detection of the failing dim headlight bulb, a visual indicator is provided by at least 3 one-quarter second flashes of the dim headlight bulb. Activation of the bright headlamp switch provides a normal rate of current to the bright headlamp bulb regardless of the detection of interruption of the magnetic field of current flow to the dim headlight bulb.

4 Claims, 3 Drawing Sheets

AUXILIARY VEHICLE LAMP OPERATION SYSTEM

CROSS-REFERENCE TO RELATED APPLICATIONS

U.S. patent application Ser. No. 13/669,178 Filed Nov. 5, 2012,
U.S. Provisional Application No. 61/555,987 Filed Nov. 4, 2011

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of lighting systems for a motor vehicle providing compensation for failure of a light source in the lighting system are known in the prior art. However, what is needed is an auxiliary vehicle lamp operation system that is based on the detection of the interruption of DC current flow by a PIC microprocessor referred to as U2 which is Hall Effect device, based upon magnetic flow to a dim headlight bulb due to dim headlight bulb failure which, upon detection activates a power width modulation transistor, referred to as Q1, which then activates an 30 volt, 55 amp N-Channel power MOSFET, referred to as Q2, through which the PIC microprocessor pulses the output of the Q2 at approximately a 50% duty (on-off) cycle to the bright headlamp bulb. This system provides power from the Q2 to the bright headlamp bulb to permit output approximately the same illumination output as the dim headlight bulb. In addition, upon detection of the failure of the dim headlight bulb, a visual indicator of such failure is provided by at least 3 one-quarter second flashes of the dim headlight bulb. Activation of the bright headlamp switch provides a normal rate of current so that the bright headlamp bulb produces the normal bright illumination output. Replacement of the dim headlight bulb deactivates the bypass to the bright headlamp bulb until replacement of the dim headlight bulb is required again.

FIELD OF THE INVENTION

The present invention relates to lighting systems for a motor vehicle that provide an auxiliary light source in the event of failure of the primary lighting system, and more particularly, to an auxiliary vehicle lamp operation system which relies upon the detection of the interruption of magnetic flow to a failing dim headlight bulb and that activates a power width modulation transistor to permit output of power to the bright headlamp bulb at approximately a 50% duty (on-off) cycle to the bright headlamp.

SUMMARY OF THE INVENTION

The general purpose of the present auxiliary vehicle lamp operation system, described subsequently in greater detail, is to provide an auxiliary vehicle lamp operation system which has many novel features that result in an auxiliary vehicle lamp operation system which is not anticipated, rendered obvious, suggested, or even implied by prior art, either alone or in combination thereof.

To accomplish this, the present auxiliary vehicle lamp operation system includes is based on detecting when the DC current flow to the dim headlight bulb of a vehicle is interrupted because of a headlight bulb failure. When the headlight switch in the vehicle is activated, the +12 VDC current flow to the dim headlight bulb is activated and flows through the Hall Effect device in a magnetic field flow sensor. This current flow creates a magnetic field that is detected by this Hall Effect device and the active current flow is indicated on the output of the device.

The output from magnetic field flow sensor is monitored by the microprocessor. When the current flow stops due to a bulb failure, the +12 VDC current is still available to the voltage regulator, which provides power to both magnetic field flow sensor and the microprocessor. The microprocessor detects the output of magnetic field flow sensor changing state and begins to operate the pulse width modulation transistor. The pulse width modulation transistor activates a 30V, 55 A N Channel power MOSFET on and off at the rate programmed into pulse width modulation output of the microprocessor. This action provides pulse width modulated current to the bright headlamp bulb through the N-Channel power MOSFET. The microprocessor pulses output with an approximately 50% duty (on-off) cycle. Testing is required for each bulb type to determine the actual pulse width modulation (or pulsing rate) and duty cycle required for that bulb element combination to provide just enough power from N-Channel MOSFET to the bright headlamp bulb for illumination output approximately the same the normal illumination output of the dim headlight bulb.

If the vehicle operator subsequently operates the headlight switch to active the bright headlamp bulb, then the current to the dim headlight bulb shuts off and the bright headlamp bulb delivers the normal full illumination output. Once the vehicle operator deactivates the bright headlamp bulb, if the magnetic field flow sensor detects no magnetic field of the current flow to the dim headlight bulb, the present system will reactivate the process so that the bright headlamp bulb again simulates the dim headlight bulb's illumination output.

When the microprocessor first determines that the dim headlight bulb has failed, the microprocessor will activate three cycles of the pulsation of the bright headlamp bulb for 0.25 seconds followed by deactivation of the bright headlamp bulb for 0.25 seconds as a visual indicator to the vehicle operator that the dim bulb has failed and needs to be replaced as soon as possible. The three pulsation cycles are followed by continuous operation of illumination output of the bright headlamp bulb to emulate the illumination output of the dim headlight bulb.

The programming for microprocessor allows for different pulsing rates and duty cycles to accommodate a wide range of headlight bulb designs. The firmware program will have de-bounce routines to determine when a valid change in conditions of the magnetic field of the current is detected.

The present device is for a single bulb with both dim and bright elements and is operationally connected between the bulb terminals and the wiring harness connector such that no wiring splices or additions are required thereby resulting in a simple plug-and-play installation procedure. The present device should be transported with protection from moisture and vibration. All components of the present device are rated to withstand temperatures in a range of −40 degrees C. to +85 degrees C. for under-the-hood applications.

As presently configured, the housing is approximately 2 inches by 3 inches; however, the device 10 is not intended to be limited by size. The magnetic field flow sensor is an Allegro p/n ACS711 KEXLT-1AB-T Hall Effect device. The microprocessor is a microchip PIC microcontroller, part number PIC12F509T-I/SN. The voltage regulator is a 3.3 VDC voltage regulator, ST micro part number LE33CD-TR. The pulse width modulation transistor is a lower power transistor. The N-Channel MOSFET is a 33V, 55 amp IRL3103 N-Channel MOSFET which can pulse +12 volts to the bright headlamp bulb. However, the foregoing components can be replaced with other components that similarly address the structural attributes and functionality required for operation of the device disclosed herein, including, but not limited to size constraints and avoidance of overheating.

Thus has been broadly outlined the more important features of the present auxiliary vehicle lamp operation system so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
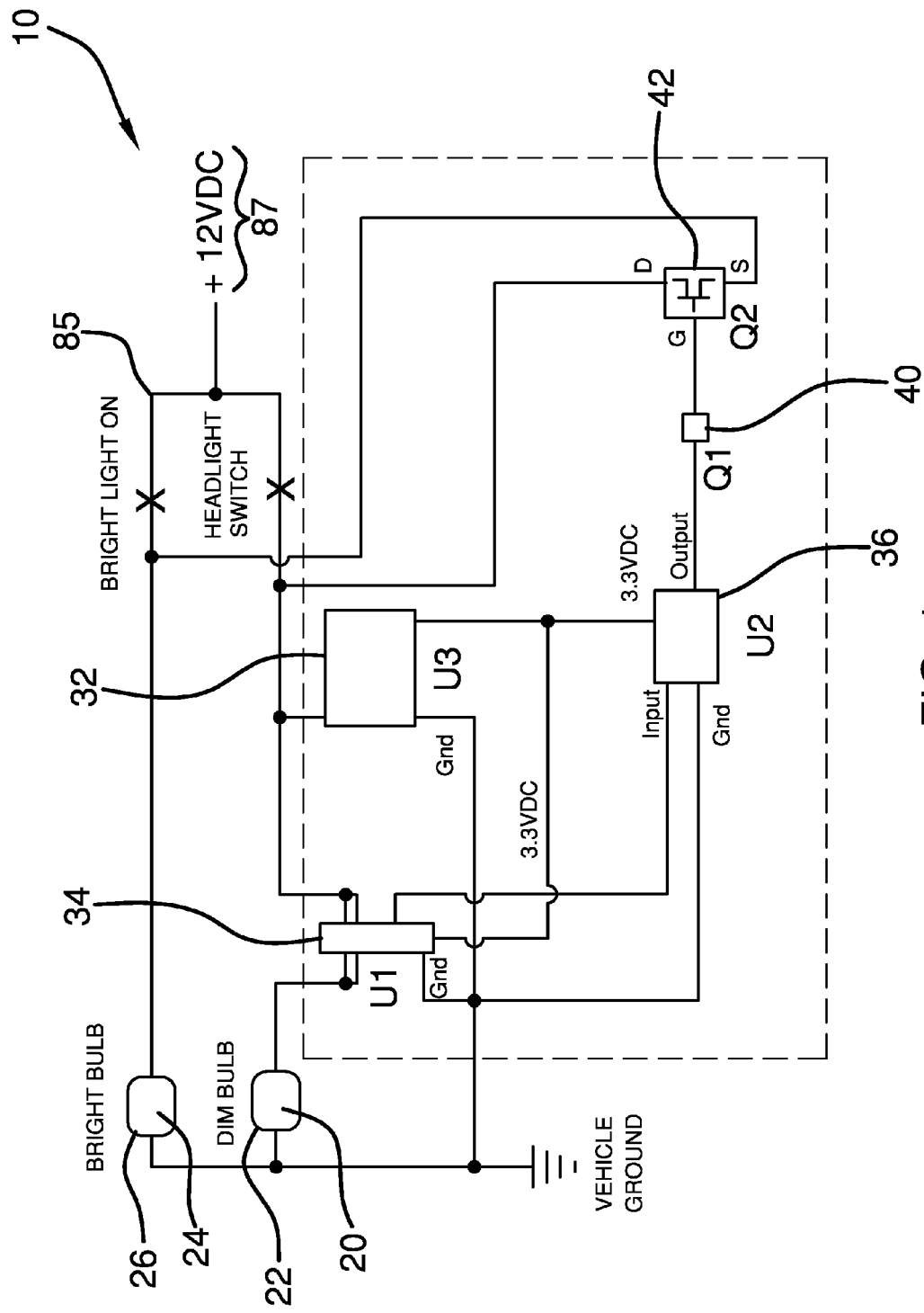
FIG. 1 is a schematic diagram.

With reference now to the drawings, and in particular FIGS. 1 through 4 thereof, an example of the instant auxiliary vehicle lamp operation system employing the principles and concepts of the present auxiliary vehicle lamp operation system and generally designated by the reference number 10 will be described.

Referring to FIGS. 1 through 4, the present auxiliary vehicle lamp operation system 10 is illustrated. The auxiliary vehicle lamp operation system 10 is devised to detect an interruption in a magnetic field produced by DC current flow to the dim headlight bulb 20 of a vehicle's dim headlight assembly 22 due to failure of the dim headlight bulb 20 and to provide the illumination output provided by the dim headlight bulb 20 with a bright headlamp bulb 24 of a bright headlight assembly 26 of the vehicle.

The auxiliary vehicle lamp operation system 10 includes a housing 30 which is disposed between a headlight switch 85 of the vehicle, which is typically found on a steering column, and both the dim headlight assembly 22 and the bright headlight assembly 26 of the vehicle. A 12 volt DC current source 87 is disposed proximal the housing 30. The DC current source 87, which is the vehicle battery, is in operational communication with the dim headlight assembly 22 and the bright headlight assembly 26. A voltage regulator 32, designated as U3 in FIG. 1, is disposed proximal the DC current source 87.

Figure 2:
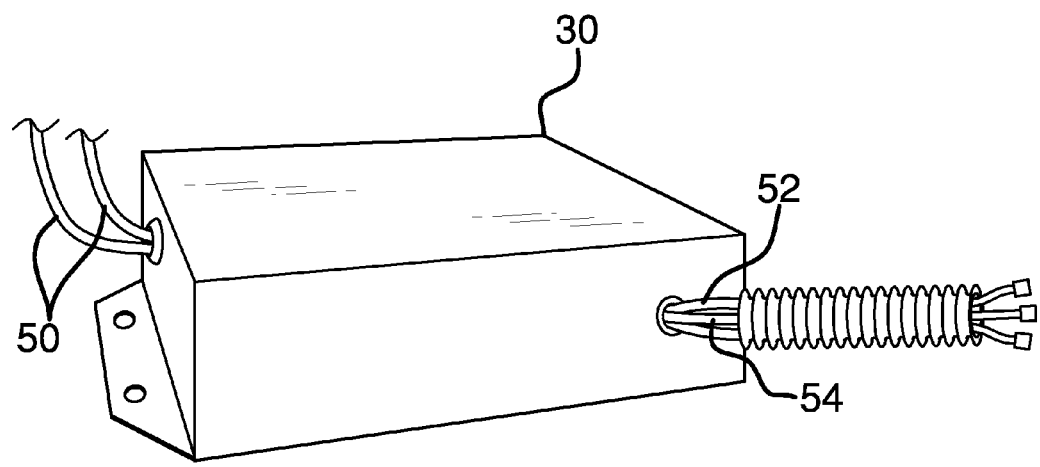
FIG. 2 is an isometric view of the housing.

A magnetic field flow sensor 34, designated as U1 in FIG. 2, is disposed within the housing 30. The magnetic field flow sensor 34 is in communication with the dim headlight bulb 20 of the dim headlight assembly 22 and the voltage regulator 32. The magnetic field flow sensor 34 is an Allegro p/n ACS711KEXLT-15AB-T Hall Effect device; but can be any magnetic field flow sensor that addresses the structural and functional attributes required for operation in accordance with the device 10 disclosed herein.

A microprocessor 36 is also disposed within the housing 30. The microprocessor 36 is in operational communication with the voltage regulator 32, the headlight switch 85, the dim headlight bulb 20, and the bright headlamp bulb 24.

A pulse width modulation transistor 40, designated as Q1 in FIG. 1, is disposed within the housing 30. The pulse width modulation transistor 40 is in operational communication with the microprocessor 36. A 33 volt 55 amp N-Channel power MOSFET 42, designated as Q2, is also disposed within the housing 30. The N-Channel power MOSFET 42 is in operational communication with the pulse width modulation transistor 40 and the bright headlamp bulb 24.

The magnetic field flow sensor 34 is configured to detect an interruption in the magnetic field of current flow to the dim headlight bulb 20. Upon the detection of the interruption of the magnetic field of current flow to the dim headlight bulb 20, the microprocessor 36 is configured to activate the pulse width modulation transistor 36. The activation of the pulse width modulation transistor 36 activates the N-Channel power MOSFET 40. Upon activation of the N-Channel power MOSFET 40, the output of current controlled by the N-Channel power MOSFET 42 to the bright headlamp bulb 20 is reduced by one of a reduction of the pulse width modulation, by a reduction in the duty cycle, and of both the pulse width modulation and the duty cycle. The amount of reduction in the pulse width modulation and alternately, the duty cycle, or in a combination thereof depends on the headlight bulb type. For example, the duty cycle can be reduced to approximately a 50% as necessary for the bright headlamp bulb 24 illumination output to equal the illumination output of the dim headlight bulb 20.

Upon reduction of the rate of current to the bright headlamp bulb 24, the bright headlamp bulb 24 produces an amount of illumination output approximately equal to the normal illumination output provided by the dim headlight bulb 20. Upon detection of the interruption of the magnetic field of the current to the dim headlight bulb 20, prior to the reduction of the rate of current to the bright headlamp bulb 24, the microprocessor 36 is configured to direct intermittent current flow to the bright headlamp bulb 24 for at least three time periods, each approximately 0.25 seconds in length, to provide a visual indicator that the dim headlight bulb 20 is failing. Upon activation of the headlight switch 85 to activate the bright headlamp bulb 24, the rate of current to the bright headlamp bulb 24 is unreduced irrespective of the detection of the interruption of the magnetic field of the current to the dim headlight bulb 20. In other words, if the vehicle operator operates the bright headlightlight switch, the current to the dim headlight bulb 20 shuts off and the bright headlamp bulb 24 delivers its full illumination output.

Figure 3:
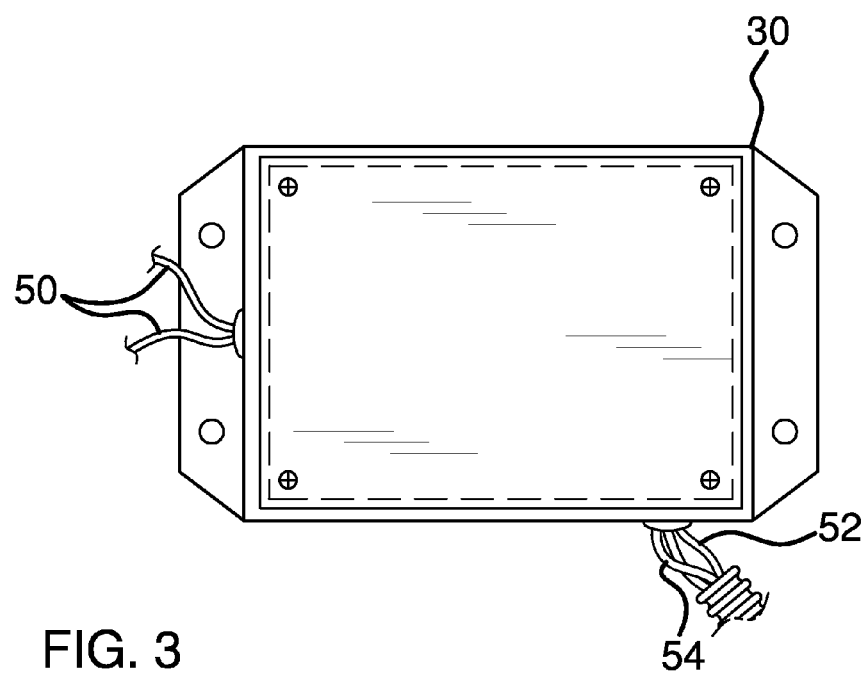
FIG. 3 is a bottom plan view of the housing.
Figure 4:
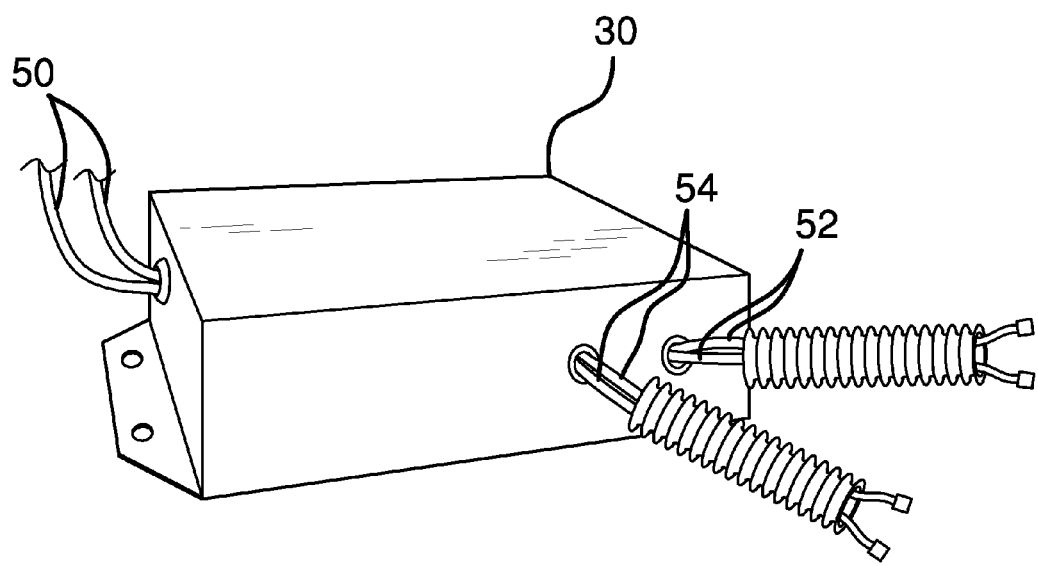
FIG. 4 is an isometric view of the housing.

FIGS. 2 through 4 illustrate the housing 30 along with the source power in wiring 50, wiring 52, 54 connecting the dim headlight bulb 20 and the bright headlamp bulb 24. In FIG. 4, wiring 54 connecting the bright headlamp bulb 24 is separate from wiring 52 connecting the dim headlight bulb 20.

What is claimed is:

1. An auxiliary vehicle lamp operation system for a motor vehicle, the motor vehicle including a DC current source and a headlight switch coupled between the DC current source and a dim headlight assembly and a bright headlight assembly, the headlight switch operable to provide current from the DC current source to the dim headlight assembly and the bright headlight assembly, the vehicle lamp operation system comprising:

a magnetic field flow sensor including at least first and second sensor wires for coupling the magnetic field flow sensor between the headlight switch and the dim headlight assembly to sense a current flow from the DC current source to the dim headlight assembly, the magnetic field flow sensor including a sensor output for providing an indication of the sensed current flow;

a microprocessor including a microprocessor input coupled to the sensor output of the magnetic field flow sensor by which the microprocessor receives the indication of the sensed current flow, the microprocessor including a microprocessor output for providing a control signal based on the indication of the sensed current flow;

a switch including first and second switch wires for connecting the switch to the bright headlight assembly and a control terminal, the control terminal coupled to the microprocessor output, whereby the microprocessor controls the switch according to the indication of the sensed current flow;

the system including power wires for connecting the system to the DC current source;

the system including bright headlamp bulb wiring for connecting the system to the bright headlight assembly;

the system including dim headlamp bulb wiring for connecting the system to the dim headlight assembly;

a housing enclosing the magnetic field flow sensor; the microprocessor and the switch, the housing adapted to pass the power wires, the bright headlamp bulb wiring and the dim headlight bulb wiring there-through.

2. The system of claim 1 further comprising: a voltage regulator including a first terminal for connecting the regulator to the headlight switch and a second terminal for connecting the regulator to a vehicle ground, the voltage regulator including a regulator output, the regulator output coupled to the microprocessor and to the magnetic field flow sensor to provide a regulated voltage thereto.

3. The system of claim 1 further comprising a transistor coupled between the output of the microprocessor and the control terminal of the switch the transistor operating the switch in accordance with the output of the microprocessors.

4. The system of claim 1 wherein the microprocessor Is configured to control the switch to reduce current provided by the DC current source to the bright headlight assembly upon detection by the magnetic field flow sensor of an interruption in the current flow to the dim headlight assembly.

* * * * *